United States Patent [19]

Matsumoto

[11] Patent Number: 4,561,389

[45] Date of Patent: Dec. 31, 1985

[54] ENGINE OPERATION CONTROL MEANS FOR SUPPRESSING ROUGH ENGINE OPERATIONS

[75] Inventor: Tokuichi Matsumoto, Hiroshima, Japan

[73] Assignee: Mazda Motor Corporation, Hiroshima, Japan

[21] Appl. No.: 697,438

[22] Filed: Feb. 4, 1985

Related U.S. Application Data

[63] Continuation of Ser. No. 488,616, Apr. 25, 1983, abandoned.

[30] Foreign Application Priority Data

Apr. 26, 1982 [JP] Japan .................................. 57-70028

[51] Int. Cl.⁴ ...................... G01L 23/22; F02M 25/06; F02P 5/04

[52] U.S. Cl. .................................... 123/425; 123/435; 123/571; 123/585

[58] Field of Search ............... 123/435, 425, 571, 626, 123/419, 422, 423, 585, 440, 418

[56] References Cited

U.S. PATENT DOCUMENTS

| | | | |
|---|---|---|---|
| 4,315,492 | 2/1982 | Gardner | 123/571 |
| 4,343,278 | 8/1982 | Asano | 123/435 |
| 4,345,558 | 8/1982 | Lanaguchi et al. | 123/425 |
| 4,347,820 | 9/1982 | Deléris | 123/425 |
| 4,357,918 | 11/1982 | Asano | 123/435 |
| 4,364,353 | 12/1982 | Fiala | 123/435 |
| 4,376,429 | 3/1983 | Youngblood | 123/435 |
| 4,387,694 | 6/1983 | Yoshiba et al. | 123/571 |
| 4,393,837 | 7/1983 | Sugihara et al. | 123/435 |

*Primary Examiner*—Raymond A. Nelli
*Attorney, Agent, or Firm*—Fleit, Jacobson, Cohn & Price

[57] ABSTRACT

An engine operation control system comprising a vibration detector for detecting engine vibrations and producing an engine vibration signal, an engine speed detector for detecting engine speed and producing an engine speed signal, an engine combustion control device for controlling at least one factor which governs engine combustion, an engine roughness control device adapted for receiving the engine vibration signal to distinguish engine roughness and effect control for a time period on the engine combustion control device so that the engine roughness is suppressed, a control time changing device adapted for receiving the engine speed signal and determining the time period wherein the engine combustion control device is controlled in accordance with the engine speed so that the time period is decreased as the engine speed increases.

12 Claims, 6 Drawing Figures

ENGINE OPERATION CONTROL MEANS FOR SUPPRESSING ROUGH ENGINE OPERATIONS

This application is a continuation of application Ser. No. 488,616, filed Apr. 25, 1983, now abandoned.

The present invention relates to engine operation control means and more particularly to means for effectively and efficiently suppressing rough engine operation.

In automobile engines, it is desirable to continously control the air-fuel ratio of the mixture supplied to the engine to an appropriate value so that pollutant emissions in the exhaust gas can be decreased and the fuel economy is improved. Further, in engines using an exhaust gas recirculating system for drawing a part of the engine exhaust gas to the intake system for the purpose of reducing nitrogen oxides, it is also necessary to control the amount of exhaust gas drawn to the intake system. For the purpose of pollutant emission control and of improving fuel economy, it is desirable that the mixture supplied to the engine be as lean as possible and, for the purpose of suppressing the nitrogen oxides in the exhaust gas, the amount of exhaust gas drawn to the intake system should be as large as possible. However, an excessively lean mixture or an excessively large amount of recirculated exhaust gas causes unstable or rough engine operation. Thus, it is desirable to control the fuel-air ratio of the mixture and the amount of the recirculated exhaust gas precisely to values below which engine unstable or rough operation just begins to occur.

Heretofore, in order to control the fuel-air ratio in this manner, Japanese Patent Publication 56-33570 proposes to provide a mixture control air passage comprised of a pair of pipes, one of the pipes being provided with a control valve and the other with a cyclically opened valve which causes a slight cyclic change in the air-fuel ratio. A detecting means is provided to detect a change in the engine speed caused by the cyclic change in the air-fuel ratio and the control valve is actuated according to the signal from the detecting means so that a desirable air-fuel ratio is obtained. However, the proposed system is disadvantageous in that a precise control of air-fuel ratio cannot be accomplished since it is difficult to detect an engine speed change due to the slight change in the air-fuel ratio at a high engine speed because the inertia of the engine rotating parts increases as the engine speed increases.

An unstable engine operation, that is, engine roughness, can be detected by providing the engine with a vibration sensor. Thus, it may be possible to operate the engine below a condition in which the engine instability is just about to occur by continuously detecting engine vibration and effecting a necessary control whenever the vibration level exceeds a predetermined value. More specifically, the control may be performed to make the mixture leaner when engine vibration is not detected but the mixture may be enriched when engine vibration is detected. However, if such mixture enriching control is made continuously or intermittently throughout the period wherein the engine instability or roughness is detected irrespective of the engine speed, there may be a problem of over control at a high engine speed. More specifically, once the roughness is produced, the engine vibration continues for a time period, usually one to three seconds, which is dependent on the natural frequency of the engine, and the number of the engine operating cycles in the time period varies depending on the engine speed. Therefore, if the mixture enriching control is effected throughout the time period, such mixture enriching control is effected in an increased number of engine operating cycles at high engine speed producing a problem of over control.

It is therefore an object of the present invention to provide an engine operation control system in which engine roughness control is accomplished as a function of the engine speed.

Another object of the present invention is to provide an engine operation control system in which engine operation is controlled to a condition below which engine roughness is just about to occur without causing over control.

A further object of the present invention is to provide an engine operation control system with which improved fuel economy can be obtained without producing unstable engine operation.

According to the present invention, the above and other objects can be accomplished by an engine operation control system comprising vibration detecting means for detecting engine vibrations and producing an engine vibration signal, engine speed detecting means for detecting engine speed and producing an engine speed signal, engine combustion control means for controlling at least one factor which governs engine combustion, engine roughness control means adapted for receiving the engine vibration signed to distinguish engine roughness and effect control for a time period on said engine combustion control means so that the engine roughness is suppressed, and control time changing means adapted for receiving the engine speed signal and determining the time period wherein the engine combustion control means is controlled in accordance with the engine speed, so that the time period is decreased as the engine speed increases.

The engine combustion control means may be air-fuel ratio control means which functions to enrich the mixture when engine roughness is detected. For example, in the case where the engine has a carburetor, the control means may include a solenoid operated valve provided in a suitable fuel passage or nozzle in the carburetor. In the case of a fuel injection type engine, the combustion control means may be incorporated in the control circuit for the fuel injection nozzle. Alternatively or in addition to the above control, the combustion control means may include means for controlling exhaust gas recirculation. Specifically, the amount of exhaust gas recirculated to the intake system is decreased when engine roughness is detected. In any event, the roughness control means may continuously perform a control on the combustion control means so that the engine operating condition approaches a state under which engine roughness is produced and as soon as the engine roughness is detected the combustion control means is actuated to the opposite direction to eliminate such roughness. According to the present invention, the time period in which the combustion control means is controlled to eliminate engine roughness is changed in accordance with the engine speed, so that it is possible to avoid over control, and therefore improved fuel economy can be obtained.

The above and other objects and features of the present invention will become apparent from the following descriptions of preferred embodiments taking reference to the accompanying drawings, in which.

Figure 1:
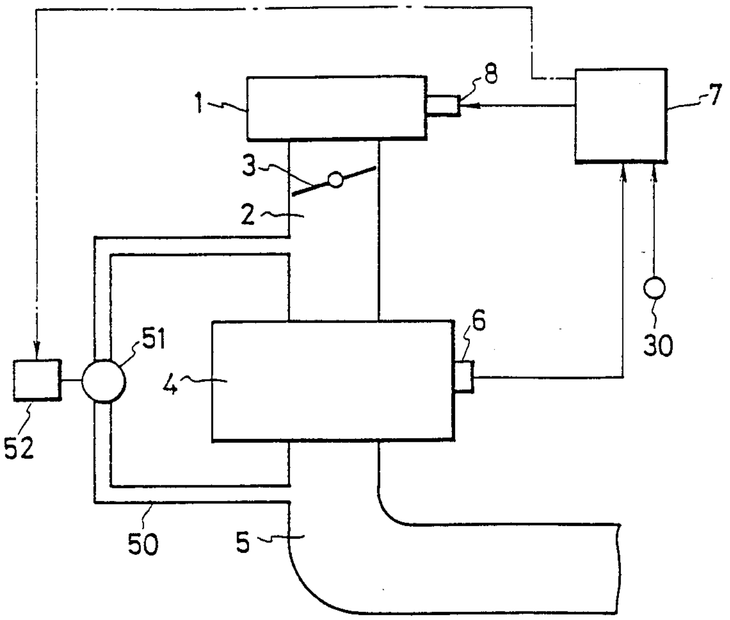
FIG. 1 is a diagrammatical illustration of an internal combustion engine embodying the features of the present invention.

Referring now to the drawings, particularly to FIG. 1, there is shown an engine 4 having an intake passage 2 and an exhaust passage 5. The intake passage 2 is provided with a carburetor 1 at the upstream end thereof and with a throttle valve 3 downstream of the carburetor 1. The carburetor 1 has an air-bleed passage (not shown) which is controlled by an actuator 8 to change the air-fuel ratio of the mixture supplied to the engine. The engine 4 also has an engine vibration detector 6 for detecting engine vibration and an engine speed detector 30 for detecting engine speed. Further, the engine 4 is provided with an exhaust gas recirculation passage 50 extending between the exhaust passage 5 and the intake passage 2. In the passage 50, there is provided a recirculation control valve 51 which is actuated by an actuator 52 for controlling the opening of the passage 50. The signals from the detectors 6 and 30 are applied to an engine roughness control circuit 7 which produces outputs for operating the actuators 8 and 52.

Figure 2:
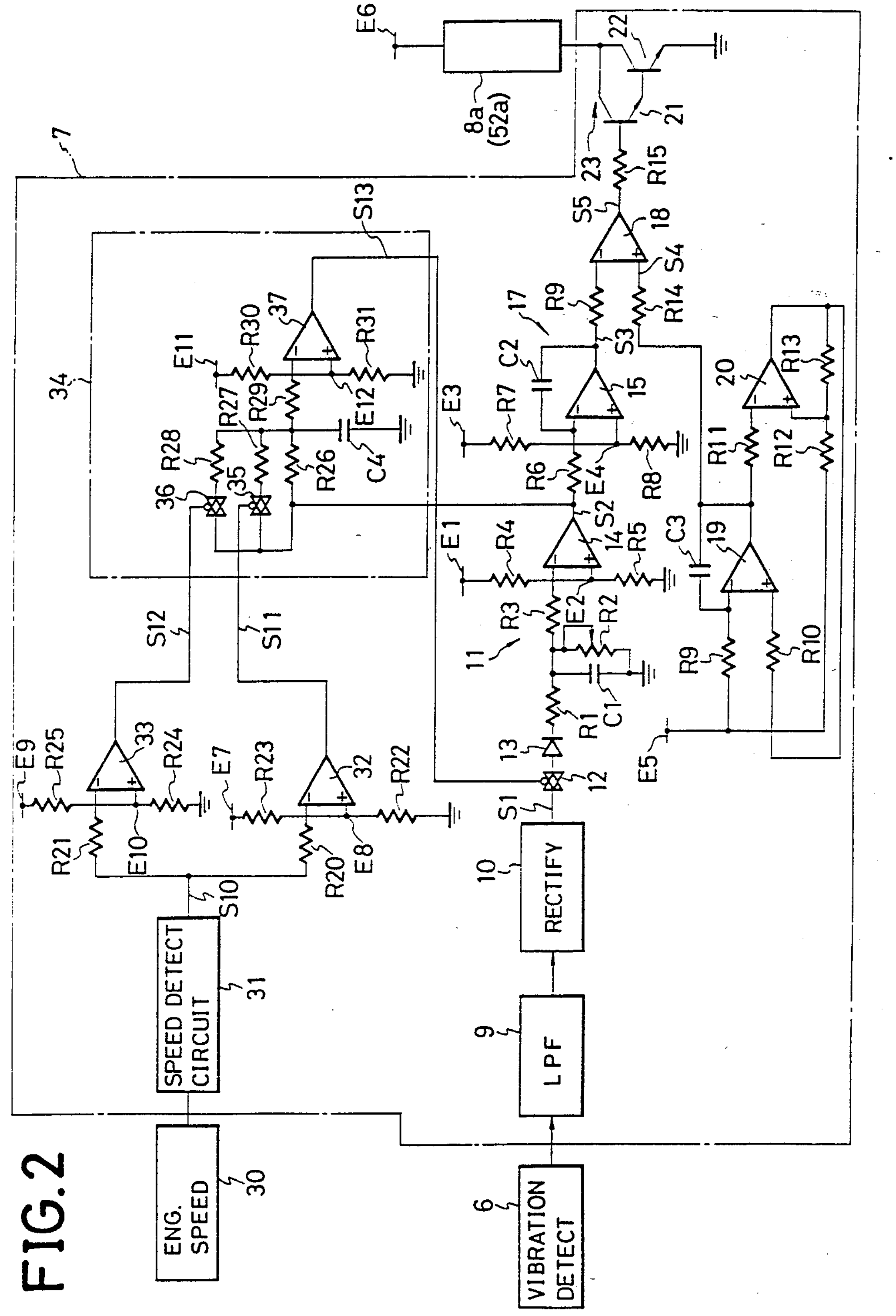
FIG. 2 is a circuit diagram showing the details of the roughness control circuit included in the engine shown in FIG. 1.

Referring to FIG. 2 which shows the details of the engine roughness control circuit 7, it will be noted that the engine vibration signal from the detector 6 is applied to a low-pass filter 9 which selectively passes low frequency signals to a rectifying circuit 10. The rectifying circuit 10 produces a rectified signal $S_1$ which is applied through an analogue switch 12 to a control period setting circuit 11. The circuit 11 includes a time delay circuit comprised of a capacitor $C_1$ and a variable resistor $R_2$. The signal which has passed through the analogue switch 12 is applied through a resistor $R_1$ to the time delay circuit and passed through a resistor $R_3$ to the negative terminal of a comparator 14 after a time delay period $T_1$ which is determined by the time delay circuit.

The comparator 14 has a positive terminal which is applied with a reference voltage $E_2$ as provided by a source voltage $E_1$ and a voltage divider comprised of a pair of series connected resistors $R_4$ and $R_5$. The comparator 14 functions to compare the signal $S_1$ with the reference voltage $E_2$ and produces a binary output signal $S_2$. When the signal $S_1$ is greater than the reference voltage $E_2$, the output signal $S_2$ is at a low level whereas, when the signal $S_1$ is smaller than the reference voltage $E_2$, the output signal $S_2$ is at a high level. The output signal $S_2$ from the comparator 14 is applied through a resistor $R_6$ to a negative terminal of an integrating circuit 17 including a capacitor $C_2$ and a comparator 15.

The comparator 15 has a positive terminal which is applied with a reference voltage $E_4$ provided by the source voltage $E_3$ and a voltage divider including a pair of series connected resistors $R_7$ and $R_8$. The comparator 15 functions to compare the signal $S_2$ with the reference voltage $E_4$ and produces a signal which is of a high level when the signal $S_2$ is smaller than the reference voltage $E_4$, but of a low level when the signal $S_2$ is larger than the reference voltage $E_4$. The output of the comparator 15 is integrated by the function of the capacitor $C_2$ to form a signal $S_3$ which is led through a resistor $R_9$ to the negative terminal of a comparator 18. The comparator 18 has a positive terminal which is applied through a resistor 14 with a triangular reference voltage $S_4$ of a predetermined frequency which is produced from a source voltage $E_5$ by a reference voltage generating circuit comprised of a comparators 19 and 20, resistors $R_9$, $R_{10}$, $R_{11}$, $R_{12}$ and $R_{13}$ and a capacitor $C_3$.

The comparator 18 constitutes a pulse modulating circuit for producing a signal $S_5$ which is of a low level when the signal $S_3$ is greater than the signal $S_4$ but of a high level when the signal $S_3$ is smaller than the signal $S_4$. The signal $S_5$ is passed through a resistor 15 to an amplifier 23 comprised of transistors 21 and 22. The actuator 8 for controlling the air-bleed passage in the carburetor 1 has a solenoid 8*a* connected with a source voltage $E_6$ and energized when the transistor 22 is made conductive.

The transistors 21 and 22 are both of the NPN type so that they are turned on when a high level signal is applied to the base of the transistor 21. The displacement of the actuator 8, that is, the opening of the air-bleed passage in the carburetor 1 is dependent on the magnitude of the signal applied to the solenoid 8*a* or on the time period wherein the solenoid 8*a* is energized. It will therefore be understood that the amount of displacement of the actuator 8 is increased as the pulse width of the high level signal $S_5$ is increased or when the signal $S_3$ is relatively small, and vice versa. In controlling the air-fuel ratio, as the actuator displacement increases, the amount of bleed air drawn into the carburetor 1 increases to make the mixture lean, whereas the mixture is enriched as the actuator displacement decreases.

The output from the engine speed detector 30 is applied to an engine speed detecting circuit 31 which produces a voltage signal $S_{10}$ which is substantially proportional to the engine speed. The signal $S_{10}$ is applied respectively through resistors $R_{20}$ and $R_{21}$ to negative terminals of comparators 32 and 33, respectively. The comparator 32 has a positive terminal which is applied with a reference voltage $E_8$ provided by a source voltage $E_7$ and a voltage divider comprised of a pair of series connected resistors $R_{22}$ and $R_{23}$. The comparator 32 functions to compare the signal $S_{10}$ with the reference voltage $E_8$ and to produce a signal $S_{11}$ which is of a low level when the signal $S_{10}$ is greater than the voltage $E_8$ but of a high level when the signal $S_{10}$ is smaller than the voltage $E_8$.

The comparator 33 has a positive terminal which is applied with a reference voltage $E_{10}$ provided by a source voltage $E_9$ and a voltage divider comprised of a pair of series connected resistors $R_{24}$ and $R_{25}$. The comparator 33 functions to compare the signal $S_{10}$ with the reference voltage $E_{10}$ and to produce an output signal $S_{12}$ which is of a low level when the signal $S_{10}$ is greater than the voltage $E_{10}$ but of a high level when the signal $S_{10}$ is smaller than the voltage $E_{10}$. The output signals $S_{11}$ and $S_{12}$ from the comparators 32 and 33, respectively, are led to analogue switches 35 and 36 of an input time control circuit 34 which controls the time period wherein the vibration signal $S_1$ is passed to the circuit 11. The signals $S_{11}$ and $S_{12}$ thus regulate the analogue switches 35 and 36 so that they are closed when they are applied with low level signals.

The input time control circuit 34 includes three parallel resistors $R_{26}$, $R_{27}$ and $R_{28}$ which are connected on one hand with a capacitor $C_4$ and on the other hand with the output of the comparator 14. The resistor $R_{26}$ is connected directly to the output of the comparator 14 whereas the resistors $R_{27}$ and $R_{28}$ are connected thereto through the analogue switches 35 and 16, respectively. The resistors $R_{26}$, $R_{27}$ and $R_{28}$ are also connected through a resistor $R_{29}$ which is parallel with the capacitor $C_4$ with a positive terminal of a comparator 37. The comparator has a negative terminal which is applied with a reference voltage $E_{12}$ provided by a source voltage $E_{11}$ and a voltage divider comprised of a pair of series connected resistors $R_{30}$ and $R_{31}$. The output signal $S_2$ is passed to the comparator 37 with a time delay $T_2$ as determined by the time delay circuit constituted by the capacitor $C_4$ and the resistors $R_{26}$, $R_{27}$ and $R_{28}$. The comparator 37 functions to compare the signal $S_2$ with the reference voltage $E_{12}$ and produce an output signal $S_{13}$ which is of a low level when the signal $S_2$ is greater than the voltage $E_{12}$ but of a high level when the signal $S_2$ is smaller than the voltage $E_{12}$. The signal $S_{13}$ is applied to the analogue switch 12, which is closed when the signal $S_{13}$ is of a high level but opened when the signal $S_{13}$ is of a low level.

In operation, when engine roughness is not detected the comparator 14 produces a high level output $S_2$ so that the output $S_3$ of the integrating circuit 17 gradually decreases. Therefore, the pulse width of the output of the comparator 18 is gradually increased and the energizing time of the actuator solenoid 8*a* is also increased. It should therefore be noted that the displacement of the actuator 8 is gradually increased to thereby increase the amount of bleed air supplied to the carburetor 1. Thus, the air-fuel mixture is gradually made leaner. Since the signal $S_2$ is at a high level, a high level signal $S_{13}$ is produced by the comparator 37 so that the analogue switch 12 is closed. The capacitor $C_4$ is charged at this instance.

When engine roughness is detected, an output $S_1$ is produced in the rectifying circuit 10 and the signal $S_1$ is led to the input of the comparator 14 with a time delay $T_1$ which is given by the time delay circuit. If the signal $S_1$ is greater than the reference voltage $E_2$, the output of the comparator 14 is turned to low level so that the output $S_3$ of the integrating circuit 17 starts to gradually increase. Thus, the pulse width of the signal $S_5$ from the comparator 18 is gradually decreased to thereby decrease the energizing time of the solenoid 8*a*. Therefore, the amount of displacement of the actuator 8 is decreased and the bleed air to the carburetor 1 is correspondingly decreased. In this manner, the mixture is enriched.

The output $S_2$ of the comparator 14 is also applied to the input time control circuit 34. Since the signal $S_2$ is at a low level in this instance, the electric charge in the capacitor $C_4$ is discharged and, after a time delay $T_3$, the voltage applied to the positive terminal of the comparator 37 becomes smaller than the reference voltage $E_{12}$ so that the output of the comparator 37 is at a low level to thereby open the analogue switch 12. Thus, the signal $S_1$ is blocked and prevented from being transmitted to the circuit 11. Then the capacitor $C_1$ starts to discharge and, after a time delay $T_4$, the voltage applied to the negative terminal of the comparator 14 becomes smaller than the reference voltage $E_2$, whereby the output $S_2$ of the comparator 14 is at a high level. Thus, the mixture enriching operation is terminated and the control for making the mixture leaner is again started as previously described.

When the signal $S_2$ is at a high level, the capacitor $C_4$ in the circuit 34 is again charged and after a time period of $T_2$ the voltage applied to the positive terminal of the comparator 37 becomes greater than the reference voltage $E_{12}$ to turn the output $S_{13}$ of the comparator 37 to high level and close the analogue switch 12. Thus, the output $S_1$ of the rectifying circuit 10 is again introduced into the circuit 11. By thus controlling the analogue switch 12, the mixture is alternately enriched and made leaner. The delay time periods $T_2$ and $T_3$ are dependent respectively on the charging and discharging times of the capacitor $C_4$. In the illustrated circuit, it will be noted that the changing and discharging time periods of the capacitor $C_4$ are varied in accordance with the engine speed. More specifically, the analogue switches 35 and 36 are sequentially closed as the engine speed increases. For example, the analogue switch 35 is closed at an engine speed corresponding to the vehicle speed of 40 km/h to connect the resistor $R_{27}$ in parallel with the resistor $R_{26}$ so that the charging and discharging time of the capacitor $C_4$ is decreased. The analogue switch 36 may be closed at an engine speed corresponding to the vehicle speed of 80 km/h to further decrease the charging and discharging time of the capacitor.

With this arrangement, it becomes possible to decrease the time period for performing the mixture enriching control as the engine speed increases. Thus, it is possible to avoid over control. It is also possible to change the mixture enriching control time by varying the resistance of the variable resistor $R_2$.

Figure 3:
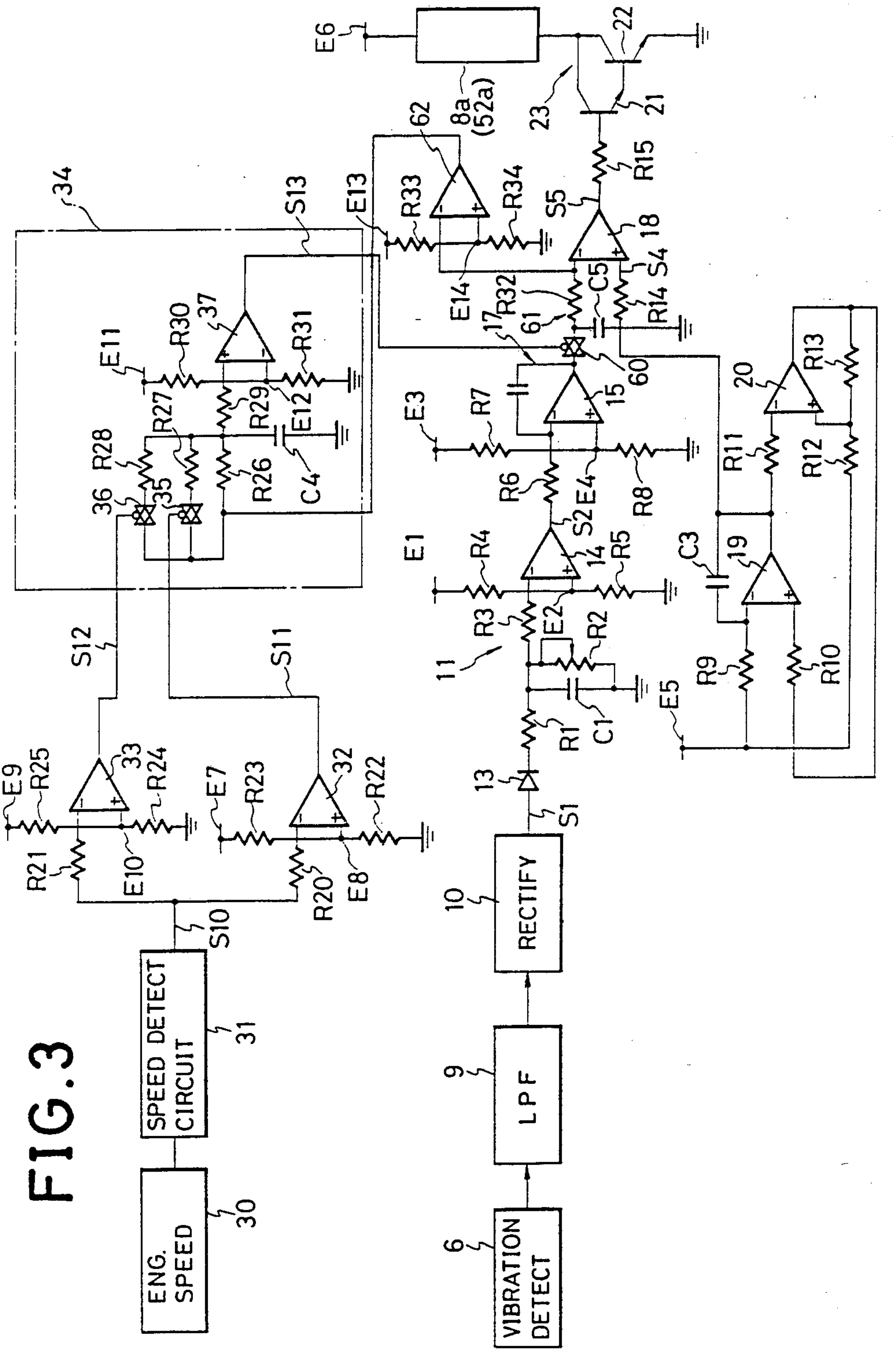
FIG. 3 is a circuit diagram similar to that shown in FIG. 2 but showing another embodiment.

FIG. 3 shows another example of the engine roughness control circuit 7 which is substantially the same as in the previous embodiment so that corresponding parts are shown by the same reference numerals. In this embodiment, the analogue switch 12 in the previous embodiment is omitted from the line between the output of the rectifier 10 and the diode 13. Instead, an analogue switch 60 is provided at the output of the integrating circuit 17 and the output of the comparator 37 is connected to the analogue switch 60 so that the switch 60 is closed when a high level signal is applied thereto. The output of the integrating circuit 17 is connected through the analogue switch 60 with an integrating circuit 61 comprised of a capacitor $C_5$ and a resistor $R_{32}$, which is connected with the negative terminal of the comparator 18. The resistor $R_{32}$ of the integrating circuit 61 is also connected with the negative terminal of a comparator 62 which has a positive terminal applied with a reference voltage $E_{14}$ provided by a source voltage $E_{13}$ and a voltage divider comprised of a pair of series connected resistors $R_{33}$ and $R_{34}$. The output of the comparator 62 is connected with the resistor $R_{26}$ in the input time control circuit 34.

When engine roughness is not detected, the output $S_2$ of the comparator 14 is at a high level so that the output $S_3$ of the integrating circuit 17 is gradually decreased. The output $S_3$ of the integrating circuit 17 is applied through the integrating circuit 61 to the comparator 18 so that the pulse width of the output $S_5$ of the comparator 18 is gradually increased. At this instance, a high level signal is produced by the comparator 62 so that the comparator 37 applies a high level signal to the analogue switch 60 to close the same.

When engine roughness is detected, the output from the integrating circuit 17 gradually increases to thereby decrease the pulse width of the output $S_5$ of the comparator 18. When the signal applied to the negative terminal of the comparator 62 becomes greater than the reference voltage $E_{14}$, the output of the comparator 62 is at a low level so that the output $S_{13}$ of the comparator 37 is also at a low level after a time delay $T_3$ as determined by the capacitor $C_4$, to thereby open the analogue switch 60. Then, the capacitor $C_5$ in the integrating circuit 61 starts to discharge and the voltage applied to the negative terminal of the comparator 18 is gradually decreased with a time constant which is determined by the capacitor $C_5$ and the resistor $R_{32}$ so that the pulse width of the output $S_5$ of the comparator 18 is again increased. The time period wherein the mixture enriching control is carried out is again varied in accordance with the engine speed as in the previous embodiment.

It should be noted that the circuits shown in FIGS. 2 and 3 can also be applied to control the actuator 52 for the exhaust gas recirculation control valve 51. For that purpose, the actuator solenoid *8a* in FIGS. 2 and 3 may simply be substituted by a solenoid *52a* for the valve actuator 52. To show this, the reference character *52a* is added with parenthesis under the reference *8a* in each of FIGS. 2 and 3. In this instance, the opening of the valve 51 is increased as the pulse width of the output $S_5$ from the comparator 18 is increased.

Figure 4:
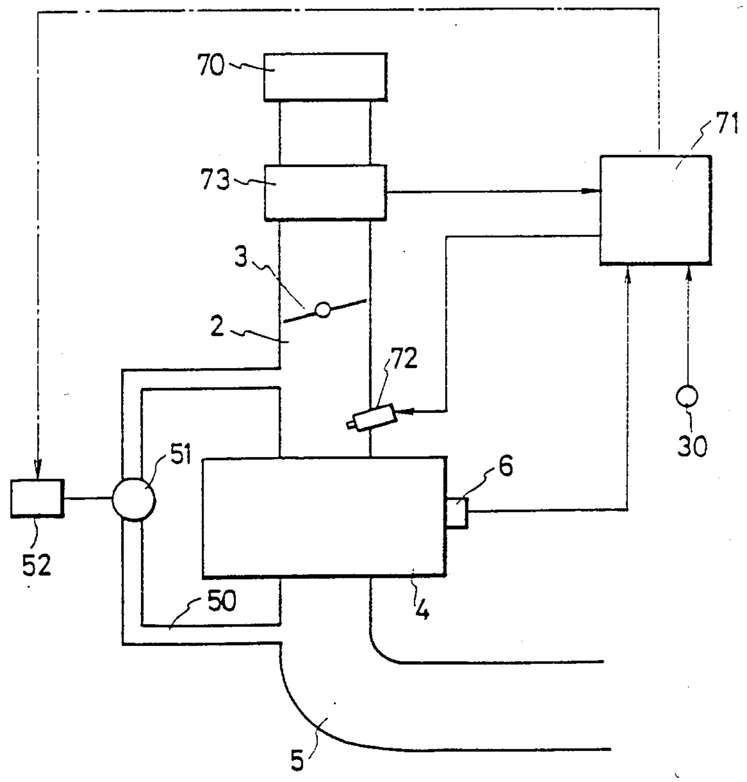
FIG. 4 is a diagrammatical view similar to FIG. 1 but showing an embodiment in which the present invention is applied to a fuel injection type engine.

FIG. 4 shows a further embodiment of the present invention in which the engine 4 has an intake passage 2 and an exhaust passage 5. A throttle valve 3 is provided in the intake passage 2 and an air cleaner 70 and an airflowmeter 73 are disposed in this order upstream of the throttle valve 3. The engine 4 also has an exhaust gas recirculation system including a recirculating passage 50, a control valve 51 and a valve actuator 52. In the intake passage 2, there is a fuel injection nozzle 72. The engine 4 is provided with an engine vibration detector 6 and an engine speed detector 30. Output signals from the vibration detector 6, the engine speed detector 30 and the air flowmeter 73 are applied to a microprocessor 71 which produces signals for controlling the fuel injection nozzle 72 and the valve actuator 52.

Figure 5:
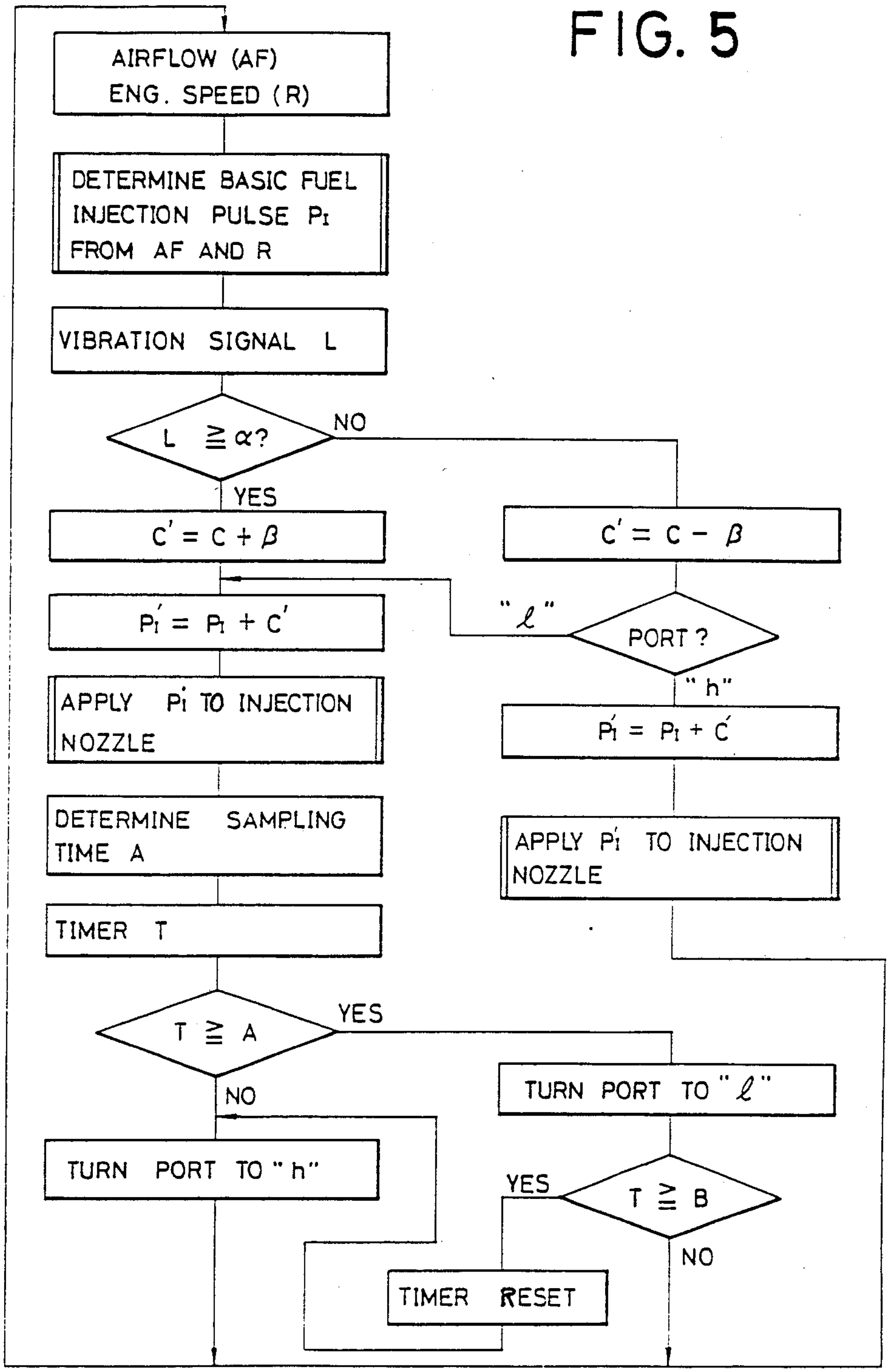
FIG. 5 is a flow diagram of the control program provided in the embodiment shown in FIG. 4.

FIG. 5 shows a flow chart of the programed operation of the microprocessor 71 for controlling the air-fuel ratio of the mixture introduced into the engine 4. The airflow signal AF and the engine speed signal R are used to determined the optimum quantity of fuel supplied to the engine 4. For the purpose, that processor 71 produces a basic pulse signal $P_I$ the duration of which is determined in accordance with the airflow signal AF and the engine speed signal R. The pulse signal $P_I$ is applied to the fuel injection nozzle 72 to actuate the same.

The processor 71 then compares the engine vibration signal L with a predetermined value $\alpha$ and determines a modification factor C which is used to modify the basic pulse signal $P_I$. When the engine vibration signal L is greater than the value $\alpha$, a previously determined factor C is added to a value $\beta$ to determine the new factor C', which is then added to a previously determined pulse signal $P_I$ to obtain a new pulse signal $P_1'$. The pulse signal $P_I'$ is then applied to the fuel injection nozzle 72. The processor 71 determines a sampling time A in accordance with the engine speed signal R so that the sampling time A is decreased as the engine speed increases. The sampling time A is then compared with a clock signal T and, unless it is detected that the sampling time A is passed, the processor 71 closes the port for introducing the engine vibration signal L into the processor 71 by applying a high signal "h" thereto. Thus, the mixture is continuously enriched as long as the vibration signal L is greater than the value $\alpha$. When the sampling time A has passed, the aforementioned port is closed by applying a low signal "l" thereto. The "l" signal is applied to the port until a time period B passes. After time period B, which is longer than the time A, the timer is reset and the port is again opened.

When the engine vibration signal L is smaller than the value $\alpha$, the previously determined factor C has subtracted therefrom the value $\beta$ to obtain a new factor C' and as long as the aforementioned port is open, the new factor C' is added to the basic pulse signal $P_I$ to obtain a new pulse signal $P_I'$ which is applied to the fuel injection nozzle 72. Since the modification factor C' is smaller than the previous factor C, the time period for injecting fuel is decreased and the mixture is made leaner. The operation is repeated as long as the vibration signal L is smaller than the value $\alpha$ by taking the factor C' in the previous cycle as the factor C and modified by the value $\beta$.

Figure 6:
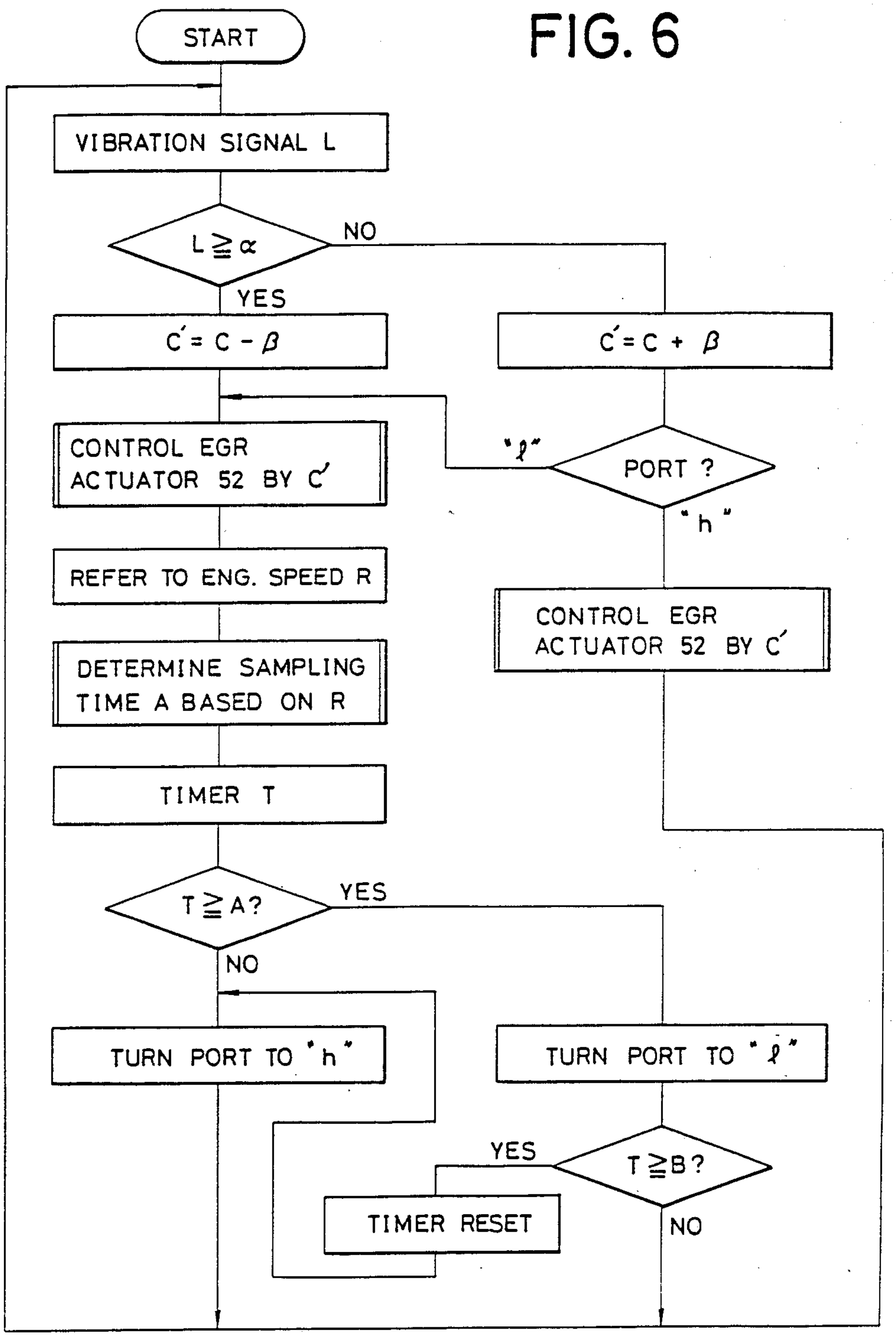
FIG. 6 shows another example of a control program.

FIG. 6 shows a program for controlling exhaust gas recirculation. The engine vibration signal L is compared with a predetermined value $\alpha$ and when the signal L is greater than the value $\alpha$, a previously determined valve actuating signal C has subtracted therefrom a value $\beta$ to obtain a new signal C', which is applied to the actuator 52 for the valve 51. Therefore, the opening of the valve 51 is decreased to thereby decrease the amount of exhaust gas recirculated to the engine intake system. The sampling time A is determined in accordance with the engine speed and as long as the sampling time A has not passed, the vibration signal L is provided to the processor 71 and the same operation is repeated.

When the engine vibration signal L is smaller than the value $\alpha$, the previously determined valve actuating signal C has added thereto value $\beta$ so that the opening of the valve 51 is increased to thereby increase the recirculated exhaust gas.

The invention has thus been shown and described with reference to specific embodiments, however, it should be noted that the invention is in no way limited to the details of the illustrated arrangements but changes and modifications may be made without departing from the scope of the appended claims.

I claim:

1. An engine operation control system comprising:

(a) vibration detecting means for detecting low frequency engine vibrations representative of engine roughness, and for providing an engine roughness signal;

(b) engine intake mixture control means responsive to said engine roughness signal for controlling at least one intake mixture parameter affecting engine combustion in a manner to avoid misfiring and for providing a control output signal for a predetermined time period;

(c) actuator means responsive to said control output signal for continuously controlling said intake mixture parameter in a direction which avoids engine roughness due to misfiring;

(d) engine speed sensing means to provide an engine speed signal;

(e) said intake mixture control means detecting when said engine speed reaches a predetermined value and subsequently adjusting said actuator means at a more rapid rate when said predetermined value is exceeded in order to minimize overcontrol by said intake mixture control means.

2. An engine operation control system in accordance with claim 1 wherein said vibration detecting means includes a vibration sensor to sense engine vibrations and to provide a vibration signal, and low-pass filter means for selectively passing vibration signals below a predetermined frequency and representative of engine roughness.

3. An engine operation control system in accordance with claim 1 wherein said intake mixture control means includes air-fuel ratio control means operable to enrich the engine air-fuel mixture when engine roughness is detected.

4. An engine operation control system in accordance with claim 1 wherein said intake mixture control means includes exhaust gas recirculation control means operable to admit exhaust gas into the engine intake and to decrease recirculated exhaust gas when engine roughness is detected.

5. An engine operation control system in accordance with claim 1 wherein the engine intake mixture control means includes air bleed means for selectively introducing bleed air into the engine intake mixture to control air-fuel ratio, said air bleed means including air bleed valve means and actuator means responsive to the control output signal from said mixture control means to position said air bleed valve means to reduce bleed air flow to minimize engine roughness.

6. An engine operation control system in accordance with claim 1 which further includes means for continuously controlling said engine intake mixture control means to control one intake mixture parameter continuously to a value below a value at which engine roughness is likely to occur.

7. An engine operation control system in accordance with claim 3 wherein the engine intake mixture control means includes fuel injection means for controlling the air-fuel ratio of the engine intake mixture, said fuel injection means including fuel injection nozzle means and air flow meter means for controlling air-fuel ratio.

8. An engine operation control system in accordance with claim 3 wherein said air-fuel ratio control means includes an air and fuel intake passage including means for providing a desired air-fuel mixture to an engine;

an air-bleed passage means in said intake passage for admitting additional air to said air-fuel mixture;

actuator means connected to said air-bleed passage means for controlling the amount of bleed air admitted to said intake passage;

said control signal applied to said actuator means to control the air-fuel mixture by reducing the quantity of bleed air to enrich the intake mixture by a predetermined rate in each engine operating cycle to suppress engine roughness.

9. An engine operation control system in accordance with claim 8 wherein said means for providing a desired air-fuel mixture is a carburetor.

10. An engine operation control system in accordance with claim 4 wherein the engine intake mixture control means includes exhaust gas recirculation means for selectively controlling the volume of exhaust gas recirculated to the engine intake system, said exhaust gas recirculation means including an exhaust gas recirculation valve and actuator means responsive to the control output signal from said mixture control means to position said exhaust gas recirculation valve to reduce exhaust gas recirculation and minimize engine roughness.

11. An engine operation control system in accordance with claim 4 which further includes means for continuously controlling the exhaust gas recirculating means to control the amount of the exhaust gas recirculated to the engine intake system.

12. An engine operation control system in accordance with claim 4 wherein said control system includes an air flowmeter in said intake system to provide an air flow output signal to said intake mixture control means; an air and fuel intake passage including means for providing a desired air-fuel mixture to an engine; and said exhaust gas recirculating means includes actuator means to control the operation of an exhaust gas recirculation control valve; said control signal applied to said actuator means to control the quantity of exhaust gas recirculated by a predetermined rate in each engine operating cycle to suppress engine roughness.

* * * * *